(12) United States Patent
Horng et al.

(10) Patent No.: US 8,506,264 B2
(45) Date of Patent: Aug. 13, 2013

(54) MOTOR AND COOLING FAN WITH A CIRCUIT BOARD HAVING A HEAT-CONDUCTING INSULATOR

(75) Inventors: Alex Horng, Kaohsiung (TW); Ming-Fu Wu, Kaohsiung (TW); Ming-Sheng Wang, Kaohsiung (TW); Kun-Li Hsieh, Kaohsiung (TW); Cheng-Te Liu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 218 days.

(21) Appl. No.: 12/856,800

(22) Filed: Aug. 16, 2010

(65) Prior Publication Data

US 2012/0039729 A1 Feb. 16, 2012

(51) Int. Cl.
*F04D 29/52* (2006.01)
*H02K 5/02* (2006.01)
*H02K 5/04* (2006.01)
*H02K 9/22* (2006.01)

(52) U.S. Cl.
USPC ......... 417/410.1; 310/88; 310/52; 417/423.8; 417/423.14; 417/366

(58) Field of Classification Search
USPC ........... 417/410.1, 354, 423.1, 423.8, 423.14; 310/89, 43, 88, 52
See application file for complete search history.

(56) References Cited

U.S. PATENT DOCUMENTS

| | | | | |
|---|---|---|---|---|
| 4,843,269 A * | 6/1989 | Shramo | | 310/208 |
| 5,492,458 A * | 2/1996 | Horng | | 417/423.7 |
| 5,562,347 A * | 10/1996 | Hsieh | | 384/215 |
| 6,175,171 B1 * | 1/2001 | Rupp et al. | | 310/52 |
| 6,394,767 B1 * | 5/2002 | Matsumoto | | 417/423.1 |
| 7,042,124 B2 * | 5/2006 | Puterbaugh et al. | | 310/89 |
| 7,443,065 B2 | 10/2008 | Chen et al. | | |
| 7,474,024 B2 * | 1/2009 | Nakanishi | | 310/71 |
| 7,567,003 B2 | 7/2009 | Hong et al. | | |
| 7,635,934 B2 * | 12/2009 | Zhu et al. | | 310/88 |
| 7,667,359 B2 * | 2/2010 | Lee et al. | | 310/86 |
| 7,745,967 B2 | 6/2010 | Zhang et al. | | |
| 7,800,263 B2 * | 9/2010 | Horng et al. | | 310/67 R |
| 2004/0256933 A1 * | 12/2004 | Toyokawa et al. | | 310/89 |
| 2005/0065294 A1 * | 3/2005 | Cramer et al. | | 525/476 |
| 2005/0123423 A1 * | 6/2005 | Weisser | | 417/423.7 |
| 2007/0085426 A1 * | 4/2007 | Lee et al. | | 310/43 |
| 2007/0145842 A1 * | 6/2007 | Zhu et al. | | 310/88 |

FOREIGN PATENT DOCUMENTS

| | | |
|---|---|---|
| CN | 2283889 Y | 6/1998 |
| CN | 2414545 Y | 1/2001 |
| CN | 101060766 A | 10/2007 |
| CN | 201263276 Y | 6/2009 |
| CN | 201526476 U | 7/2010 |

\* cited by examiner

*Primary Examiner* — Devon Kramer
*Assistant Examiner* — Nathan Zollinger
(74) *Attorney, Agent, or Firm* — Alan Kamrath; Kamrath IP Lawfirm, P.A.

(57) ABSTRACT

A motor includes a base, a stator, a rotor, a circuit board and a heat-conducting insulator. The base includes a cooling plate. The stator is coupled to the base. The rotor is rotatably coupled to the base and aligned with the stator. The circuit board is received in the base and electrically connected to the stator. The heat-conducting insulator is disposed between the cooling plate and the circuit board, and abuts with the cooling plate and one face of the circuit board.

16 Claims, 8 Drawing Sheets

MOTOR AND COOLING FAN WITH A CIRCUIT BOARD HAVING A HEAT-CONDUCTING INSULATOR

BACKGROUND OF THE INVENTION

1. Field of the Invention

The present invention generally relates to a motor and a cooling fan utilizing the motor and, more particularly, to a motor with better heat dissipation efficiency and a cooling fan utilizing the motor.

2. Description of the Related Art

Referring to FIG. 1, a conventional motor 9 including a first housing 91, a second housing 92, a stator 93, a rotor 94 and a circuit board 95 is shown. The first housing 91 includes a compartment 911 having an opening. The second housing 92 is located on the opening of the compartment 911. The stator 93 is received in the compartment 911. The rotor 94 rotatably extends through the second housing 92 to be fixed in a center of the stator 93. The circuit board 95 has one face abutting with a shoulder portion 921 of the second housing 92 and another face abutted and pressed by a covering plate 922. Since the covering plate 922 is made of a metal material, an insulation board 96 is required to be disposed between the covering plate 922 and the circuit board 95 to prevent the circuit board 95 from being short-circuited. In the motor shown in FIG. 1, the circuit board 95 is electrically connected to the stator 93, enabling the circuit board 95 to control the stator 93 for triggering rotation of the rotor 94.

During operation of the motor 9, some parts of the motor 9 such as the stator 93, electronic components 951 on the circuit board 95 and bearings 97, will have increasing temperature during operation of the motor 9. Therefore, two air rooms are designed on two sides of the circuit board 95, enabling heat generated by the electronic components 951 to be dissipated into the air rooms. The heat in the air rooms then experiences heat exchange with external air through the covering plate 922 by ways of air convection or thermal conduction, thus cooling the temperature in the motor 9.

However, since the circuit board 95 is separated from the covering plate 922 by the insulation board 96 made of an insulation material with low thermal conductivity such as polyvinyl chloride or polystyrene, the insulation board 96 is not able to efficiently guide the heat to the covering plate 922 for heat exchange. In this case, the hot air in the motor 9 can only have heat exchange with the external air by way of air convection, leading to low heat dissipation efficiency of the motor 9. Thus, the motor 9 will have shorter service life or even breaks down. Therefore, it is desired to improve the conventional motor 9.

SUMMARY OF THE INVENTION

It is therefore the primary objective of this invention to provide a motor with improved cooling efficiency and a cooling fan utilizing the motor.

It is another objective of this invention to provide a motor with protection of electronic components mounted on a circuit board thereof, and a cooling fan utilizing the motor.

The invention discloses a motor including a base, a stator, a rotor, a circuit board and a heat-conducting insulator. The base includes a cooling plate. The stator is coupled to the base. The rotor is rotatably coupled to the base and aligned with the stator. The circuit board is received in the base and electrically connected to the stator. The heat-conducting insulator is disposed between the cooling plate and the circuit board, and abuts with the cooling plate and one face of the circuit board.

Furthermore, the invention discloses a cooling fan including a frame, a base, a stator, a rotor, a circuit board and a heat-conducting insulator. The frame includes an air inlet and an air outlet. The base is received in and connected to the frame via a plurality of connection members, and includes a cooling plate. The stator is coupled to the base. The rotor is rotatably coupled to the base and aligned with the stator, and includes a plurality of vanes evenly arranged on an outer periphery thereof. The circuit board is received in the base and electrically connected to the stator. The heat-conducting insulator is disposed between the cooling plate and the circuit board, and abuts with the cooling plate and one face of the circuit board.

Furthermore, the invention discloses a cooling fan including a base, a stator, a rotor, a circuit board and a heat-conducting insulator. The base includes a cooling plate, an annular wall and a covering plate. The annular wall is located on an outer periphery of the cooling plate. The covering plate is coupled to one end of the annular wall. The covering plate includes an air inlet. The annular wall includes an air outlet on one side thereof. The air inlet and the air outlet communicate with each other. The stator is received in the base and disposed between the cooling plate and the covering plate. The rotor is rotatably coupled to the base and aligned with the stator, and includes a plurality of vanes evenly arranged on an outer periphery thereof. The circuit board is disposed between the stator and the cooling plate, and electrically connected to the stator. The heat-conducting insulator is disposed between the cooling plate and the circuit board, and abuts with the cooling plate and one face of the circuit board.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
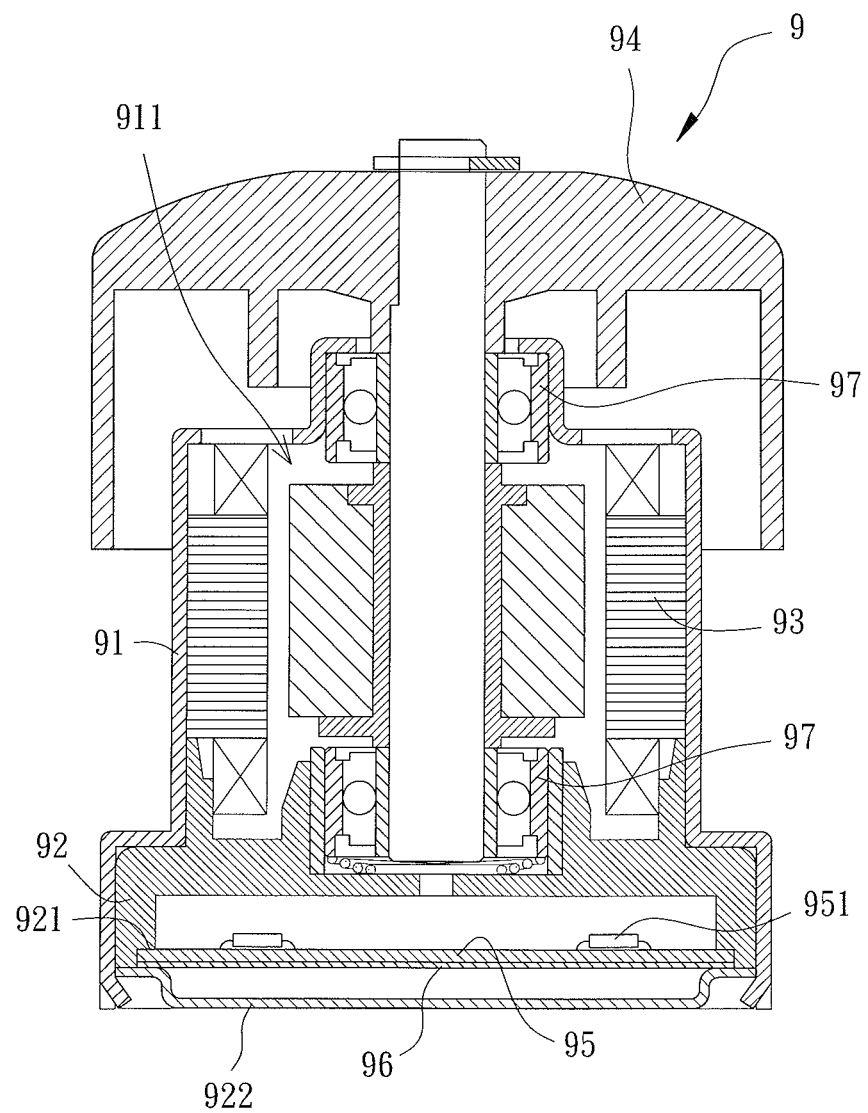
FIG. 1 shows a side cross sectional view of a conventional motor.

In the various figures of the drawings, the same numerals designate the same or similar parts. Furthermore, when the terms "first", "second", "third", "fourth", "inner", "outer", "top", "bottom" and similar terms are used hereinafter, it should be understood that these terms have reference only to the structure shown in the drawings as it would appear to a person viewing the drawings and are utilized only to facilitate describing the invention.

DETAILED DESCRIPTION OF THE INVENTION

Figure 2:
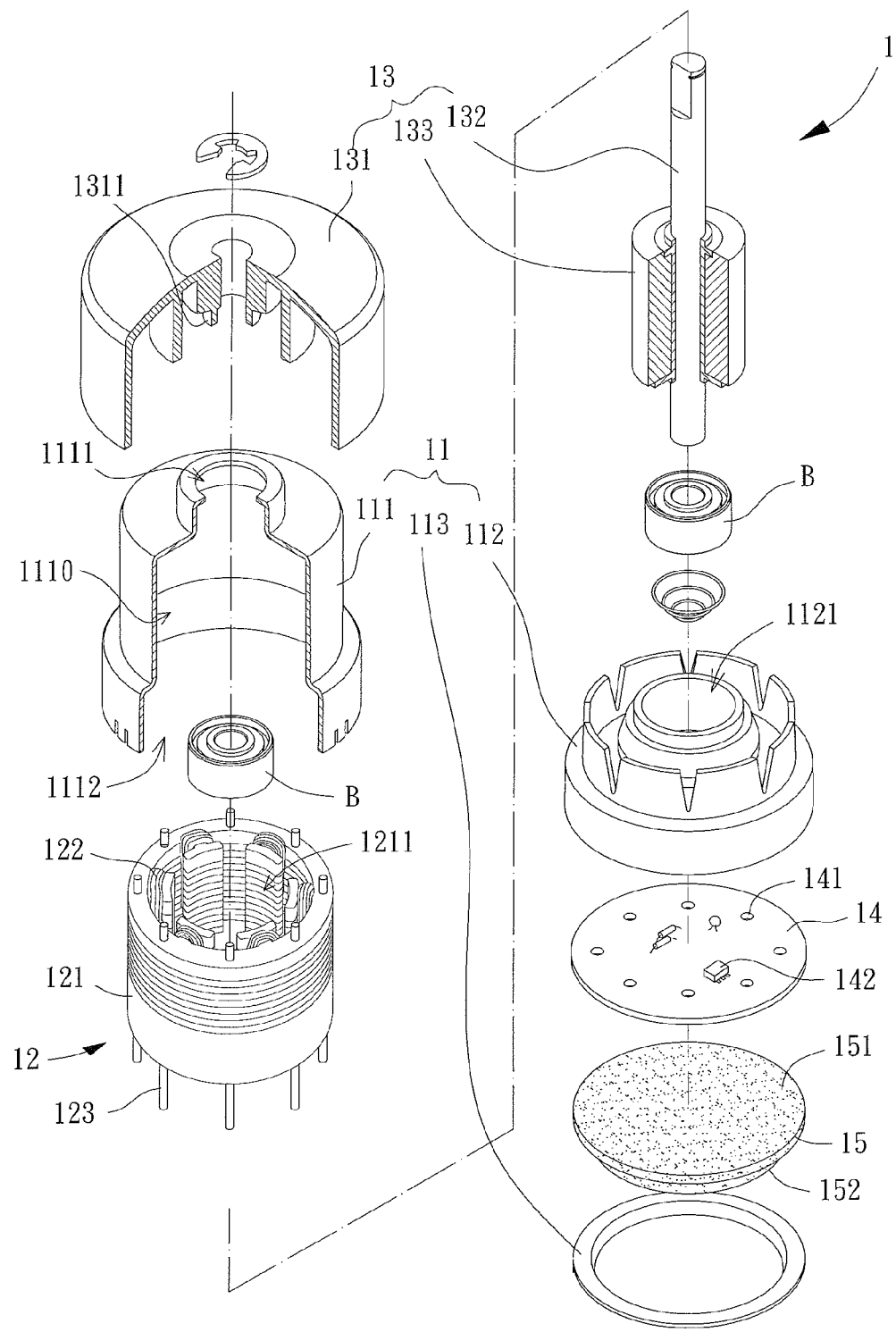
FIG. 2 shows an exploded diagram of a motor according to a first embodiment of the invention.
Figure 3:
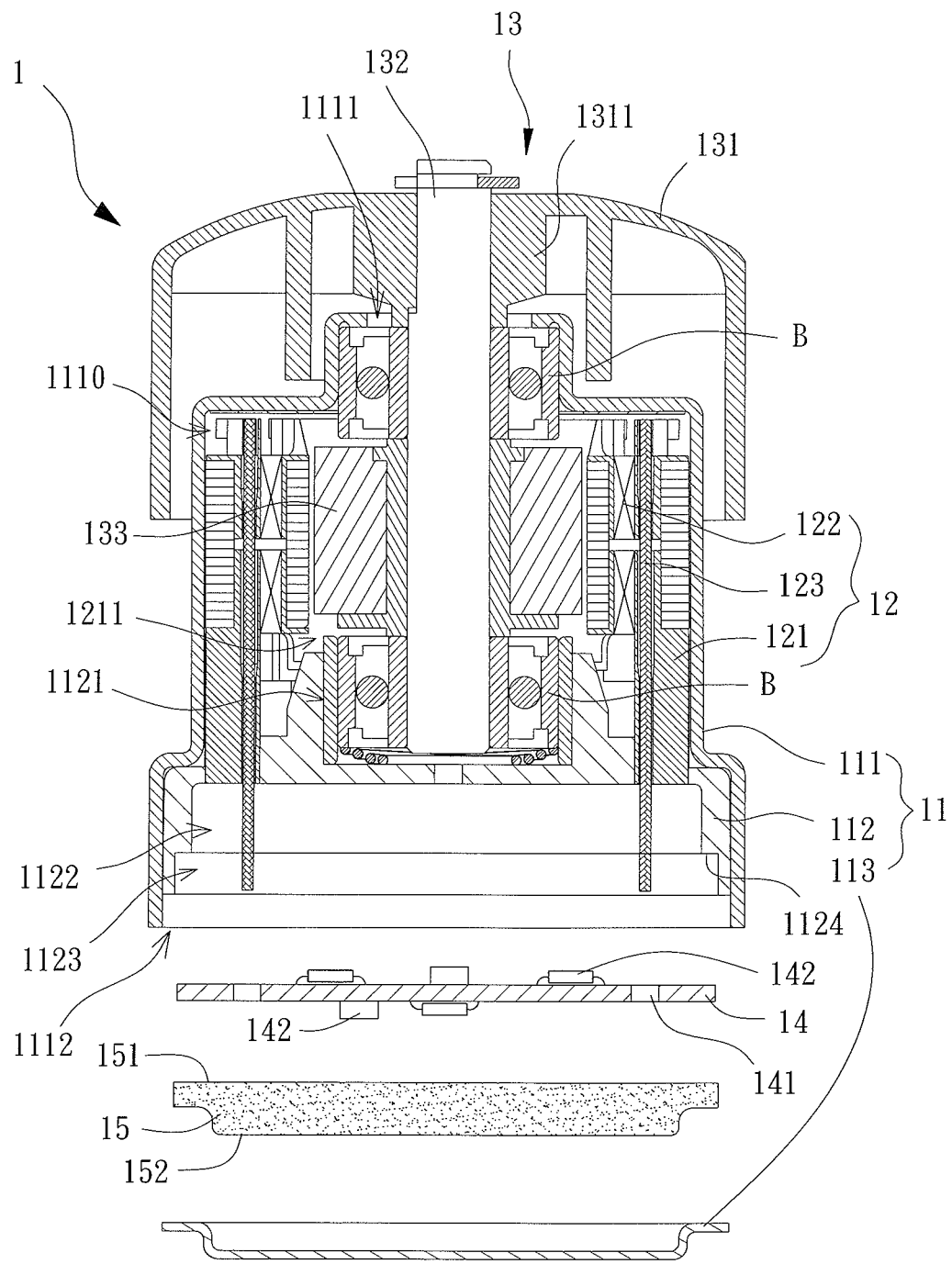
FIG. 3 shows a side cross sectional view of the motor according to the first embodiment of the invention, with some parts of the motor not being assembled yet.

Referring to FIGS. 2 and 3, an inner-rotor-type motor 1 is used as an example in a first embodiment of the invention for illustration purposes. The inner-rotor-type motor 1 includes a base 11, a stator 12, a rotor 13, a circuit board 14 and a heat-conducting insulator 15. The stator 12 is coupled to the base 11. The rotor 13 is rotatably coupled to the base 11. The circuit board 14 and the heat-conducting insulator 15 are received in the base 11. Based on this, the stator 12 may drive the rotor 13 to rotate.

The base 11 includes a first body 111, a second body 112 and a cooling plate 113. The first body 111 is hollow and has an assembling room 1110, a shaft hole 1111 and an assembling hole 1112. The shaft hole 1111 and assembling hole 1112 are located on the top and the bottom of the assembling room 1110, respectively. The second body 112 is disposed in the assembling room 1110 via the assembling hole 1112. The second body 112 includes a receiving room 1121 and a compartment 1122, respectively. The receiving room 1121 is used to receive a bearing B. The compartment 1122 includes an opening 1123 on a bottom side of the second body 112. In addition, the compartment 1122 includes a shoulder portion 1124 on an inner face thereof, with the shoulder portion 1124 being close to the opening 1123. The cooling plate 113 is preferably made of a metal material with excellent thermal conductivity, such as copper or aluminum. The cooling plate 113 is disposed at the opening 1123 for enclosing the compartment 1122.

The stator 12 includes a body 121 and a plurality of coils 122. The body 121 has a receiving hole 1211. The coils 122 are coupled with the body 121 while annularly arranged on an inner circumferential wall of the receiving hole 1211. The coils 122 may be coupled to an inner face of the body 121 as shown in FIG. 3. The stator 12 further includes a plurality of heat-conducting members 123 protruding out of the body 121 in an axial direction of the inner-rotor-type motor 1. Each heat-conducting member 123 has one end extending through the circuit board 14. The heat-conducting members 123 are preferably made of a material with excellent thermal conductivity.

The rotor 13 includes a rotating member 131, a shaft 132 and a permanent magnet 133. The rotating member 131 has an axial seat 1311 on a center thereof. The shaft 132 has one end coupling to the axial seat 1311, as well as another end extending through the receiving hole 1211 of the body 121 and rotatably coupling to the bearing B disposed in the receiving room 1121. The permanent magnet 133 is coupled to an outer peripheral face of the shaft 132 by ways of close fitting, buckling, adhering, and so on. In addition, the permanent magnet 133 is disposed in the receiving hole 1211 and aligned with the coils 122.

Figure 4:
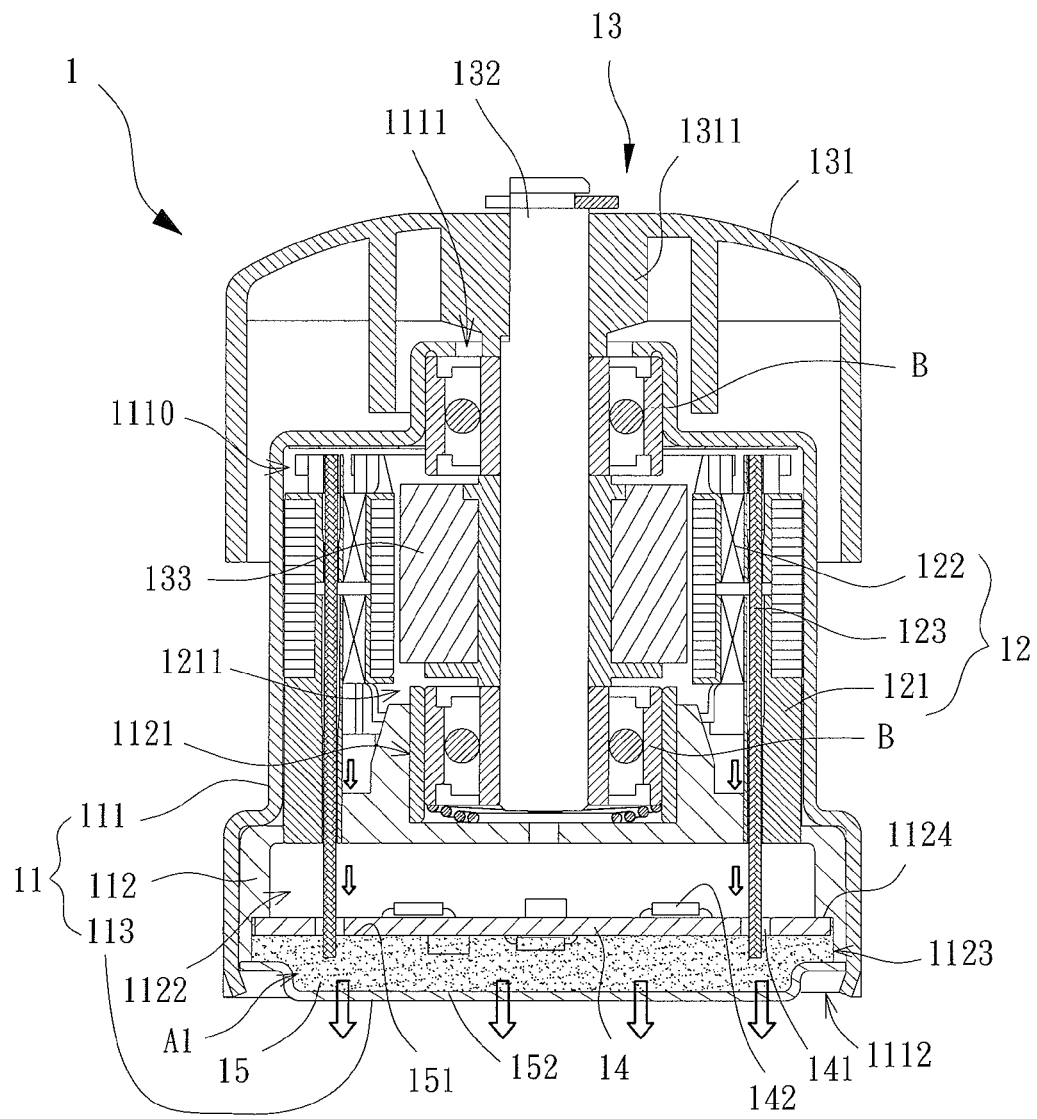
FIG. 4 shows the side cross sectional view of the motor according to the first embodiment of the invention after complete assembly.

Referring to FIGS. 3 and 4, the circuit board 14 is a conventional printed circuit board (PCB) disposed in the compartment 1122. The circuit board 14 has an outer periphery abutting with the shoulder portion 1124 of the compartment 1122, enabling a first room A1 to be formed between the cooling plate 113 and circuit board 14. The circuit board 14 includes a plurality of through-holes 141 and a plurality of electronic components 142 (such as driving circuits, transistors or passive components), with the through-holes 141 extending through two sides of the circuit board 14. The heat-conducting members 123 extend through the circuit board 14 via the through-holes 141 and are soldered with the circuit board 14 to allow electrical connection between the electronic components 142 and the coils 122 of the stator 12.

The heat-conducting insulator 15 is made of the insulation material with excellent thermal conductivity. The insulation material with excellent thermal conductivity is preferably a thermosetting material such as acrylic resin, silica gel or other composite material with silica gel. The thermosetting material may be further mixed with ceramic powders or metal powders with excellent thermal conductivity to improve the heat dissipation efficiency thereof. The heat-conducting insulator 15 is received in the first room A1 between the cooling plate 113 and the circuit board 14 to separate the circuit board 14 from the cooling plate 113. Thus, electrical contact between the cooling plate 113 and the circuit board 14 is prevented. The heat-conducting insulator 15 includes a heat-absorbing face 151 and a heat-exchanging face 152 opposing to the heat-absorbing face 151. In addition, the heat-conducting insulator 15 preferably has substantially the same shape as the first room A1 so that the heat-absorbing face 151 and heat-exchanging face 152 thereof may respectively abut with the circuit board 14 and the cooling plate 113 when disposed in the first room A1.

Referring to FIG. 4, when in use, the inner-rotor-type motor 1 will have increasing temperature due to heat generated by the coils 122 of the stator 12, the electronic components 142 of the circuit board 14 and the bearing B. In the meanwhile, since the heat-absorbing face 151 of the heat-conducting insulator 15 keeps absorbing the heat generated by the electronic components 142, the absorbed heat may be delivered to the cooling plate 113 from the heat-exchanging face 152. In this way, the cooling plate 113 may be able to dissipate the heat generated by the electronic components 142 to the outside by way of heat exchange, as indicated by the arrows in FIG. 4.

Moreover, the heat-conducting members 123 of the stator 12 may extend through the through-holes 141 of the circuit board 14 and contact with the heat-conducting insulator 15, allowing the heat generated by the coils 122 of the stator 12 to be delivered to the heat-conducting insulator 15 via the heat-conducting members 123 for heat exchange with the external air, as indicated by the arrows in FIG. 4.

The inner-rotor-type motor 1 in the first embodiment is characterized by the heat-conducting insulator 15 disposed between the cooling plate 113 and the circuit board 14 not only can prevent the circuit board 14 from being short-circuited due to its insulation, but also efficiently delivers the heat generated by the coils 122 and the electronic components 142 to the cooling plate 113 for heat exchange with the external air due to its excellent thermal conductivity. In this way, the inner-rotor-type motor 1 improves over the conventional motor 9 in terms of heat dissipation efficiency.

Figure 5:
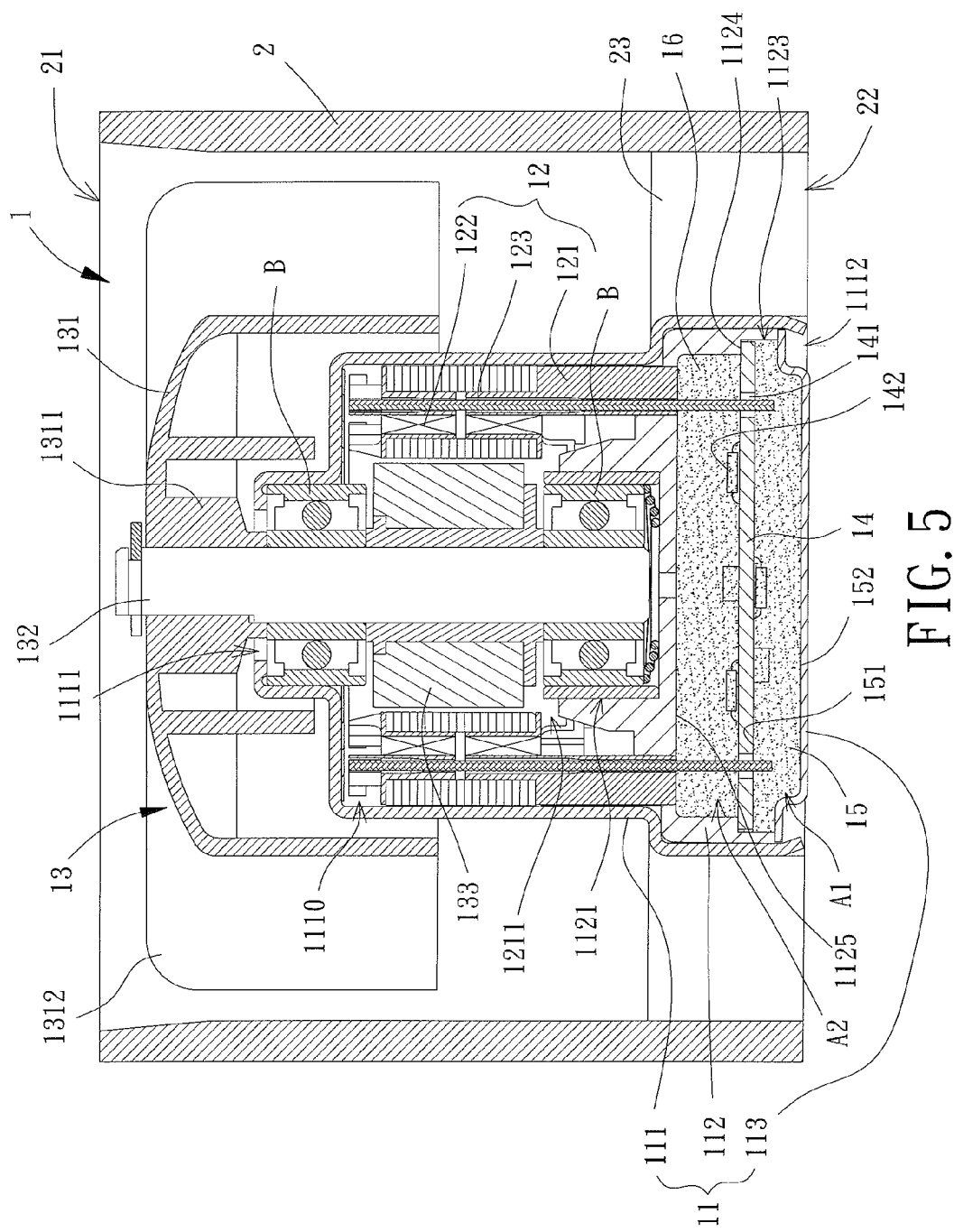
FIG. 5 shows a side cross sectional view of an axial flow fan utilizing the motor of the first embodiment according to a second embodiment of the invention.

The inner-rotor-type motor 1 in the first embodiment may be applied to various cooling fans. Referring to FIG. 5, the inner-rotor-type motor 1 is shown to be applied to an axial flow fan according to a second embodiment of the invention. The axial flow fan includes an inner-rotor-type motor 1 and a frame 2. The rotating member 131 of the inner-rotor-type motor 1 includes a plurality of vanes 1312 evenly arranged on an outer periphery of the rotating member 131. When the circuit board 14 is placed at the shoulder portion 1124 of the compartment 1122, a second room A2 is also formed between the circuit board 14 and a blocking wall 1125 of the compartment 1122 except for the first room A1 formed between the cooling plate 113 and the circuit board 14. The second room A2 is for receiving an auxiliary heat-conducting insulator 16 which preferably has substantially the same shape as the second room A2. Alternatively, the second room A2 may be stuffed with the auxiliary heat-conducting insulator 16 so that the auxiliary heat-conducting insulator 16 may have one face abutting with one face of the circuit board 14. The auxiliary heat-conducting insulator 16 is made of the insulation material with excellent thermal conductivity, which is preferably the thermosetting material described above.

The frame 2 is made of a plastic or metal material. The frame 2 has an air inlet 21 and an air outlet 22, with an air channel being formed therebetween. In addition, the base 11 is received in the frame 2, and the frame 2 may be connected to the first body 111 of the base 11 via a plurality of connection members 23. The connection members 23 may be ribs or stationary blades.

In the first embodiment, two sides of the circuit board 14 are respectively abutted by the heat-conducting insulator 15 and the auxiliary heat-conducting insulator 16. Since the heat-conducting insulator 15 and the auxiliary heat-conducting insulator 16 are of great flexibility, they are able to completely cover the electronic components 142 of the circuit board 14. Based on this, the heat-conducting insulator 15 and the auxiliary heat-conducting insulator 16 not only can keep absorbing the heat generated by the electronic components 142, but also prevent the electronic components 142 from damages caused by collisions resulting from external forces. Thus, cooling efficiency is improved, and the electronic components 142 are protected, prolonging the service life of the inner-rotor-type motor 1.

Figure 6:
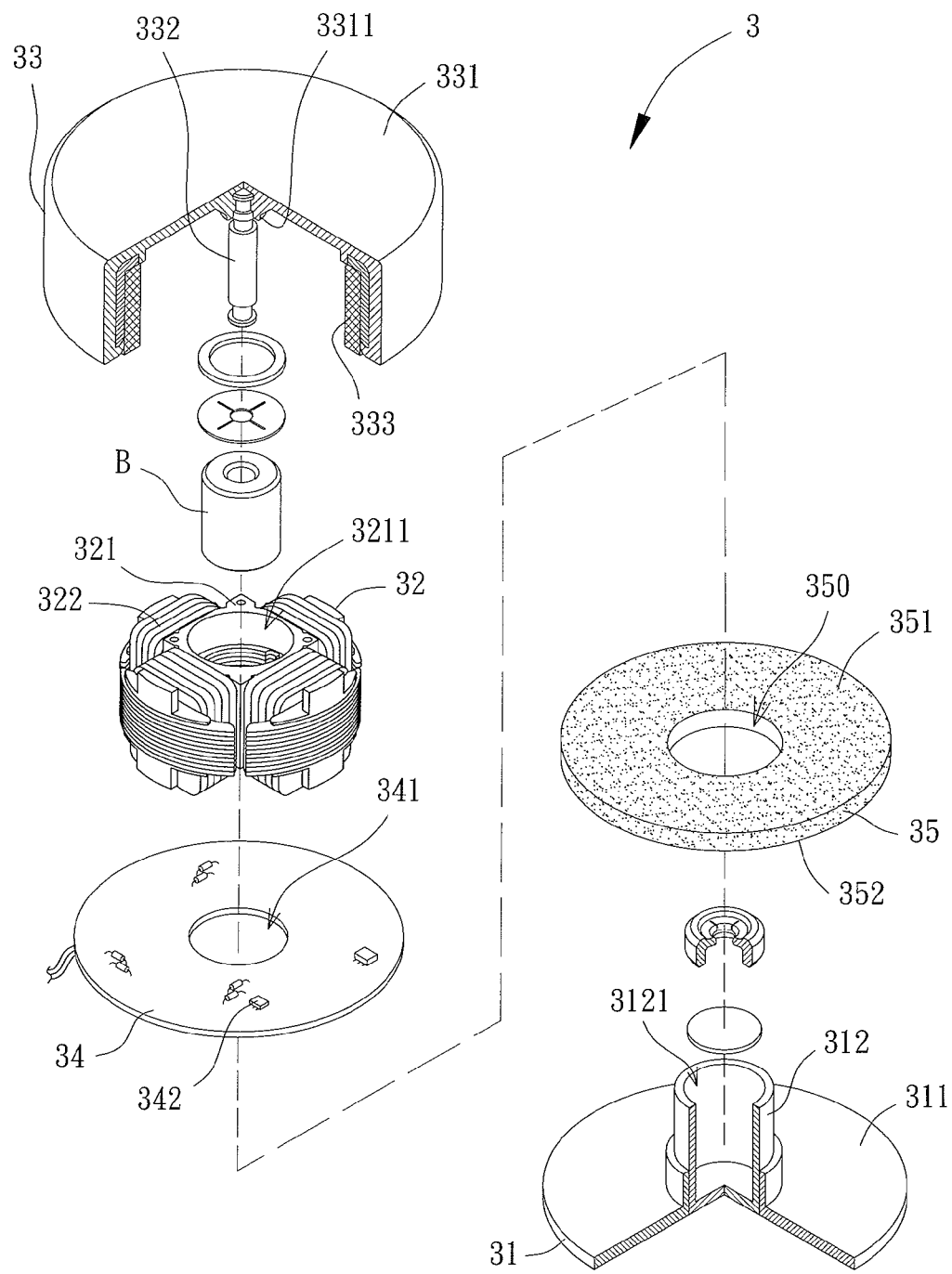
FIG. 6 shows an exploded diagram of a motor according to a third embodiment of the invention.
Figure 7:
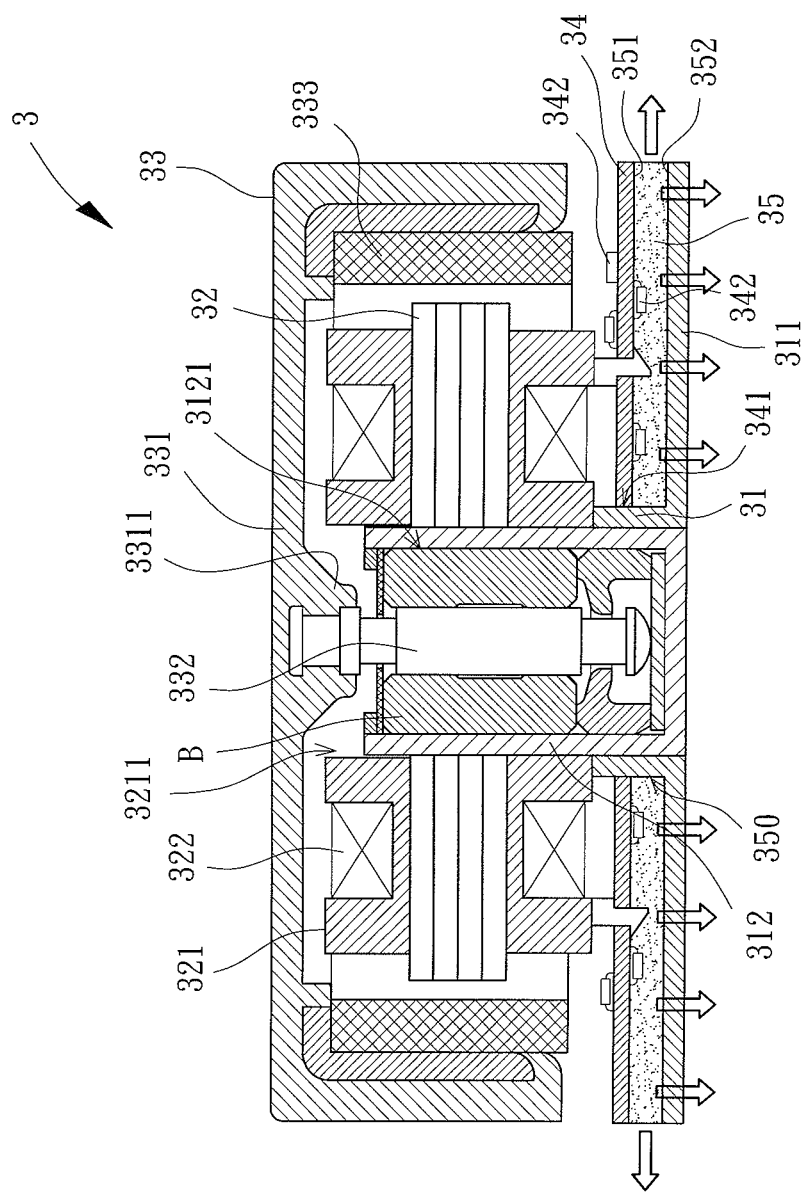
FIG. 7 shows a side cross sectional view of the motor according to the third embodiment of the invention.

Referring to FIGS. 6 and 7, an outer-rotor-type motor 3 is used as an example in a third embodiment of the invention for illustration purpose. The outer-rotor-type motor 3 includes a base 31, a stator 32, a rotor 33, a circuit board 34 and a heat-conducting insulator 35. The base 31 includes a cooling plate 311 and a shaft tube 312. The cooling plate 311 is preferably made of the metal material with excellent thermal conductivity, such as copper or aluminum. The shaft tube 312 has an axial hole 3121 and is disposed at a center of a top face of the cooling plate 311.

The stator 32 includes a body 321 and a plurality of coils 322. The body 321 has a receiving hole 3211. The body 321 is coupled with the shaft tube 312 by coupling the receiving hole 3211 of the body 321 with an outer periphery of the shaft tube 312. The coils 322 are coupled with the body 321 while surrounding the receiving hole 3211.

The rotor 33 includes a rotating member 331, a shaft 332 and a permanent magnet 333. The rotating member 331 has an axial seat 3311 on a center thereof. The shaft 332 has one end coupling with the axial seat 3311, as well as another end rotatably extending into the axial hole 3121 of the shaft tube 312 via the bearing B. The permanent magnet 333 is coupled with an inner peripheral face of the rotating member 331 while surrounding the coils 322.

The circuit board 34 has a through-hole 341 on a center thereof. The through-hole 341 is coupled with the outer periphery of the shaft tube 312. The circuit board 34 is located between the cooling plate 311 and the stator 32. The circuit board 34 has a plurality of electronic components 342 mounted on two sides thereof.

The heat-conducting insulator 35 also has a through-hole 350 on a center thereof. The heat-conducting insulator 35 is coupled with the shaft tube 312 by coupling the through-hole 350 with the outer periphery of the shaft tube 312. In this arrangement, the heat-conducting insulator 35 may separate the circuit board 34 from the cooling plate 311 to avoid electrical connection between the circuit board 34 and the cooling plate 311. The heat-conducting insulator 35 includes a heat-absorbing face 351 and a heat-exchanging face 352 respectively abutting with the circuit board 34 and the cooling plate 311.

During operation of the outer-rotor-type motor 3, the heat-conducting insulator 35 keeps absorbing the heat generated by the electronic components 342 via the heat-absorbing face 351 thereof, and delivers the absorbed heat to the cooling plate 311 via the heat-exchanging face 352 thereof. In this way, the heat generated by the electronic components 342 may be delivered to the outside by way of heat exchange. The absorbed heat of the heat-conducting insulator 35 may have heat exchange with the external air via a surface of the heat-conducting insulator 35, as indicated by the arrows in FIG. 7.

Figure 8:
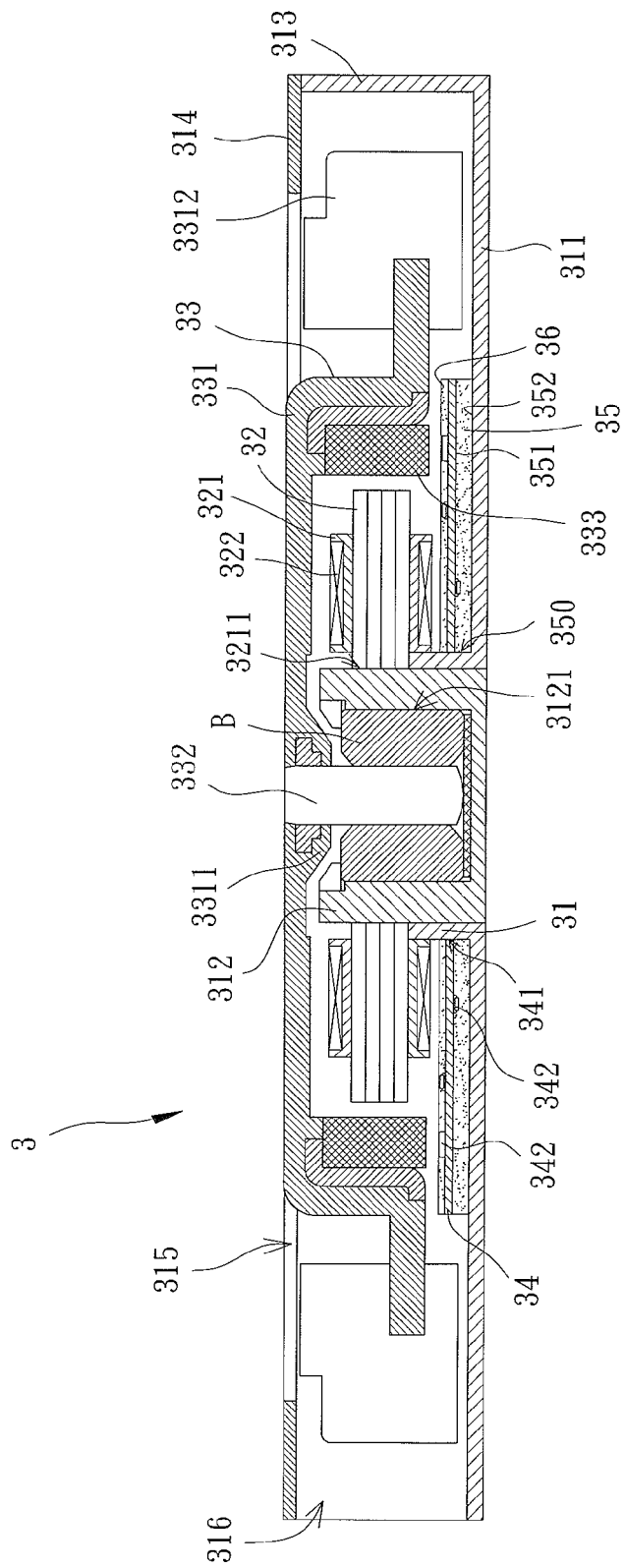
FIG. 8 shows a side cross sectional view of an air-blowing fan utilizing the motor of the third embodiment according to a fourth embodiment of the invention.

The outer-rotor-type motor 3 in the third embodiment may be applied to various cooling fans. Referring to FIG. 8, the outer-rotor-type motor 3 is shown to be applied to an air-blowing fan according to a fourth embodiment of the invention. The base 31 of the outer-rotor-type motor 3 is used as a frame of the air-blowing fan, which further includes an annular wall 313 and a covering plate 314. The annular wall 313 is located on an outer periphery of the cooling plate 311. The covering plate 314 is coupled to one end of the annular wall 313. The covering plate 314 includes an air inlet 315, and the annular wall 313 includes an air outlet 316 on one side thereof, with the air inlet 315 and the air outlet 316 communicating with each other. The rotating member 331 includes a plurality of vanes 3312 evenly arranged on an outer periphery of the rotating member 331.

The outer-rotor-type motor 3 in the embodiment further includes an auxiliary heat-conducting insulator 36 disposed between the stator 32 and the circuit board 34. Specifically, one face of the circuit board 34 facing the stator 32 is coated with the auxiliary heat-conducting insulator 36, so that the electronic components 342 mounted on that face is coated with the auxiliary heat-conducting insulator 36.

In the third embodiment, two sides of the circuit board 34 are respectively abutted by the heat-conducting insulator 35 and the auxiliary heat-conducting insulator 36. Based on this, the heat-conducting insulator 35 and the auxiliary heat-conducting insulator 36 not only can keep absorbing the heat generated by the electronic components 342, but also deliver the absorbed heat to the outside via the cooling plate 311. The absorbed heat may have heat exchange with the external air though the surface of the heat-conducting insulator 35, improving heat dissipation efficiency thereof. Moreover, because the heat-conducting insulator 35 and the auxiliary heat-conducting insulator 36 are of great flexibility, the electronic components 342 may be well-covered by the heat-conducting insulator 35 and the auxiliary heat-conducting insulator 36 for protection.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor, comprising:
   a base including a cooling plate;
   a stator coupled to the base;
   a rotor rotatably coupled to the base and aligned with the stator;
   a circuit board coupled to the base, having first and second faces and electrically connected to the stator;
   a plurality of electronic components mounted on the first and second faces of the circuit board;

a heat-conducting insulator disposed between the cooling plate and the first face of the circuit board and between the cooling plate and the plurality of electronic components mounted on the first face of the circuit board, and respectively abutting with the cooling plate and one face of the circuit board, wherein the heat-conducting insulator is made of an insulation material selected from one of acrylic resin, silica gel and other composite material with silica gel and one of a ceramic powder and a metal powder; and an auxiliary heat-conducting insulator disposed at the second face of the circuit board and extending over the plurality of electronic components mounted on the second face of the circuit board, wherein the auxiliary heat-conducting insulator is made of an insulation material selected from one of acrylic resin, silica gel and other composite material with silica gel;

wherein the stator includes an upper end and a lower end spaced from the upper end in a direction parallel to the rotor, with the stator further including a plurality of circumferentially spaced heat-conducting members each having one end extending beyond the lower end and through the circuit board to contact with the heat-conducting insulator and having another end extending to the upper end, with the plurality of the circumferentially spaced heat-conducting members extending parallel to the rotor.

2. The motor as claimed in claim 1, wherein the base further includes an assembling room and a compartment having an opening, the stator is received in the assembling room and the circuit board is disposed in the compartment, and the cooling plate is disposed at the opening of the compartment.

3. The motor as claimed in claim 2, wherein the compartment further includes a shoulder portion abutting with an outer periphery of the circuit board to form a first room between the cooling plate and the circuit board, and the heat-conducting insulator is received in the first room.

4. The motor as claimed in claim 3, wherein a second room is formed between the circuit board and a blocking wall of the compartment, an auxiliary heat-conducting insulator is received in the second room, and the auxiliary heat-conducting insulator has one face abutting with another face of the circuit board.

5. The motor as claimed in claim 1, wherein the base further includes a shaft tube disposed at a center of a top face of the cooling plate, the shaft tube has an axial hole and an outer periphery, the rotor is rotatably coupled with the axial hole, and the stator and the circuit board are coupled with the outer periphery of the shaft tube.

6. The motor as claimed in claim 5, wherein the heat-conducting insulator has a through-hole on a center thereof, the heat-conducting insulator is coupled with the shaft tube by coupling the through-hole with the outer periphery of the shaft tube, and the heat-conducting insulator is disposed between the cooling plate and the circuit board.

7. The motor as claimed in claim 2, wherein the stator includes a body and a plurality of coils, the body has a receiving hole, and the coils are coupled with the body and annularly arranged on an inner circumferential wall of the receiving hole.

8. The motor as claimed in claim 7, wherein the rotor includes a rotating member, a shaft and a permanent magnet, the shaft has one end coupling to a center of the rotating member and another end extending through the receiving hole of the body to rotatably couple to the base, and the permanent magnet is coupled to an outer peripheral face of the shaft and is aligned with the coils.

9. The motor as claimed in claim 5, wherein the stator includes a body and a plurality of coils, the body has a receiving hole, and the coils are coupled with the body while surrounding the receiving hole.

10. The motor as claimed in claim 9, wherein the rotor includes a rotating member, a shaft and a permanent magnet, the shaft has one end coupling to a center of the rotating member and another end extending through the receiving hole of the body to rotatably extend into the axial hole of the shaft tube, and the permanent magnet is coupled with an inner peripheral face of the rotating member while surrounding the coils.

11. A cooling fan including:
a frame including an air inlet and an air outlet;
a base received in and connected to the frame via a plurality of connection members, wherein the base includes a cooling plate;
a stator coupled to the base;
a rotor rotatable coupled to the base and aligned with the stator, and including a plurality of vanes arranged on an outer periphery thereof;
a circuit board coupled to the base, having first and second faces and electrically connected to the stator;
a plurality of electronic components mounted on the first and second faces of the circuit board;
a heat-conducting insulator disposed between the cooling plate and the first face of the circuit board and between the cooling plate and the plurality of electronic components mounted on the first face of the circuit board, and respectively abutting with the cooling plate and the first face of the circuit board, wherein the heat-conducting insulator is made of an insulation material selected from one of acrylic resin, silica gel and other composite material with silica gel and one of a ceramic powder and a metal powder; and
an auxiliary heat-conducting insulator disposed at the second face of the circuit board and extending over the plurality of electronic components mounted on the second face of the circuit board, wherein the auxiliary heat-conducting insulator is made of an insulation material selected from one of acrylic resin, silica gel and other composite material with silica gel;
wherein the stator includes an upper end and a lower end spaced from the upper end in a direction parallel to the rotor, with the stator further including a plurality of circumferentially spaced heat-conducting members each having one end extending beyond the lower end and through the circuit board to contact with the heat-conducting insulator and having another end extending to the upper end, with the plurality of the circumferentially spaced heat-conducting members extending parallel to the rotor.

12. The cooling fan as claimed in claim 11, wherein the base further includes an assembling room and a compartment having an opening, the stator is received in the assembling room and the circuit board is disposed in the compartment, and the cooling plate is disposed at the opening of the compartment.

13. The cooling fan as claimed in claim 12, wherein the compartment further includes a shoulder portion abutting with an outer periphery of the circuit board to form a first room between the cooling plate and the circuit board, and the heat-conducting insulator is received in the first room.

14. The cooling fan as claimed in claim 13, wherein a second room is formed between the circuit board and a blocking wall of the compartment, the auxiliary heat-conducting insulator is received in the second room, and the auxiliary heat-conducting insulator has one face abutting with the second face of the circuit board.

15. The cooling fan as claimed in claim 11, wherein the base further includes a shaft tube disposed at a center of a top face of the cooling plate, the shaft tube has an axial hole and an outer periphery, the rotor is rotatably coupled with the axial hole, and the stator and the circuit board are coupled with the outer periphery of the shaft tube.

16. The cooling fan as claimed in claim 15, wherein the heat-conducting insulator has a through-hole on a center thereof, the heat-conducting insulator is coupled with the shaft tube by coupling the through-hole with the outer periphery of the shaft tube, and the heat-conducting insulator is disposed between the cooling plate and the circuit board.

* * * * *